Figure 1:
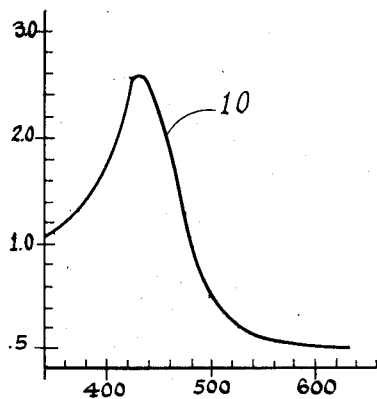

July 1, 1930.  L. A. JONES  1,769,518

FILM FOR PICTURE AND SOUND REPRODUCTION

Filed April 12, 1929     3 Sheets-Sheet 1

INVENTOR
LOYD A. JONES
BY
ATTORNEY

July 1, 1930.  L. A. JONES  1,769,518
FILM FOR PICTURE AND SOUND REPRODUCTION
Filed April 12, 1929    3 Sheets-Sheet 2
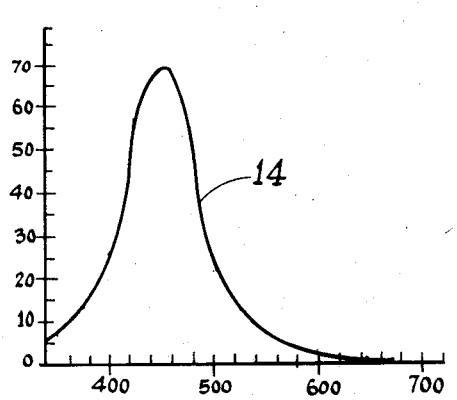
FIG.-2
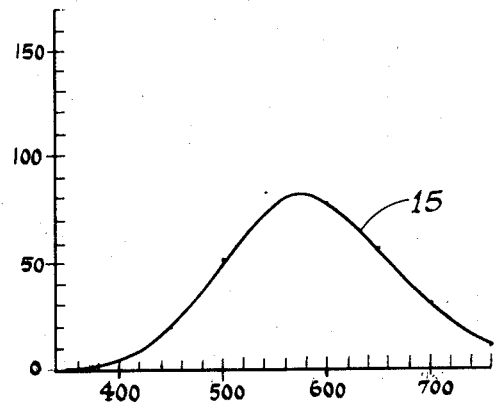
FIG.-2A
FIG.-2B
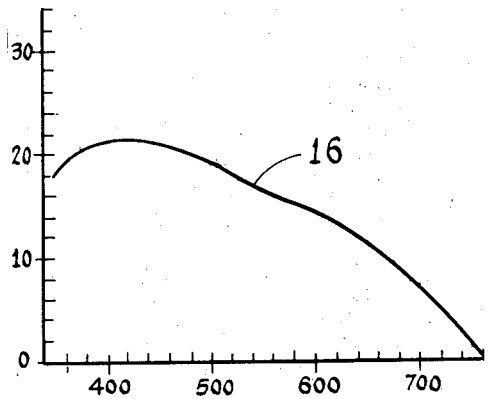
DIFFERENLY COLORED LONG SECTIONS OF FILM
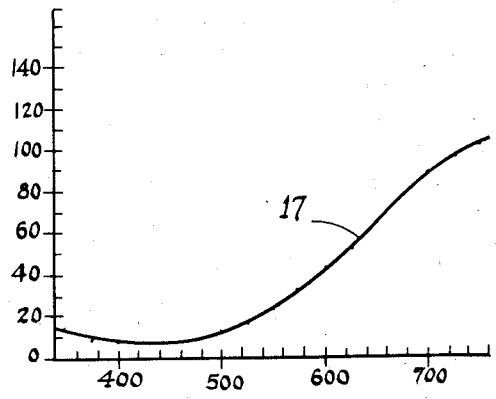
FIG.-2C
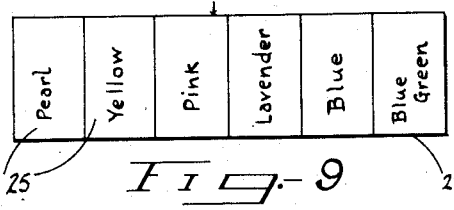
FIG.-9
INVENTOR
LOYD A. JONES
BY
Newton M. Perkins
ATTORNEY July 1, 1930.   L. A. JONES   1,769,518
FILM FOR PICTURE AND SOUND REPRODUCTION
Filed April 12, 1929    3 Sheets-Sheet 3
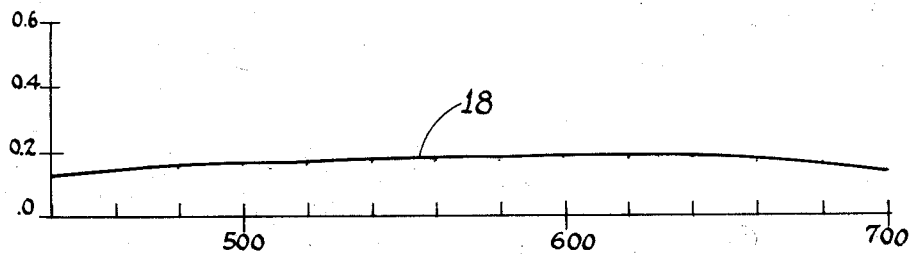
Fig.-3
Fig.-4
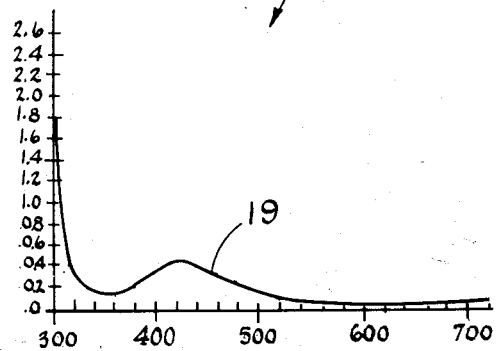
Fig.-5
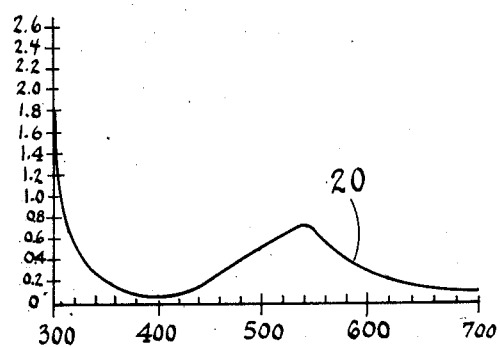
Fig.-6
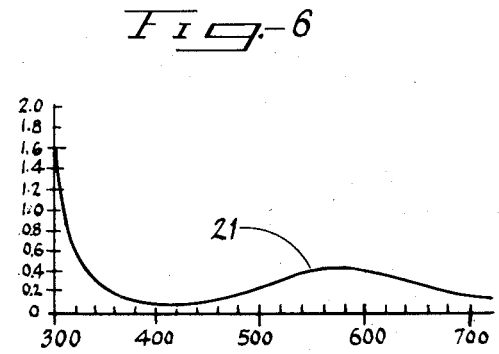
Fig.-7
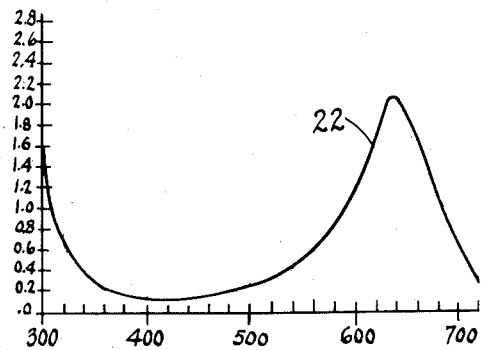
Fig.-8
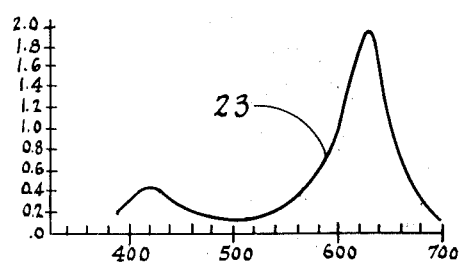
INVENTOR
LOYD A. JONES
BY
ATTORNEY Patented July 1, 1930

1,769,518

UNITED STATES PATENT OFFICE

LOYD A. JONES, OF ROCHESTER, NEW YORK, ASSIGNOR TO EASTMAN KODAK COMPANY, OF ROCHESTER, NEW YORK, A CORPORATION OF NEW YORK

FILM FOR PICTURE AND SOUND REPRODUCTION

Application filed April 12, 1929. Serial No. 354,650.

This invention relates to tinted films for use in the synchronized reproduction of sound and motion pictures from the same record.

It is now standard practice to use various tinted or colored films to present pleasing visual effects when projected on a screen. However, these various tints absorb the different wave length radiations to different degrees so that ordinary tinted motion picture film has not been used for the photographic reproduction of sound in connection with motion pictures, where the sound record is made on one edge of the positive film and where the sound is reproduced by means of a light sensitive cell actuated by variations in density or variations in the width of the sound record. Since such a sound record is reproduced by passing the film bearing it between a source of radiations and the light sensitive cell, unsatisfactory sound reproduction is encountered arising from the fact that many of the dyes used in reproducing the desired color effects or tints of the positive film, absorb strongly those wave lengths of radiation to which the light cell is sensitive. As a result of this absorption, the intensity of radiation reaching the cell is reduced to such an extent that it is necessary to increase the amplification of the variable currents generated by the light sensitive cell. Not only it is inconvenient to use this necessary high amplification but when it is used the quality of reproduced sound is seriously impaired as compared with the case when lower degrees of amplification are used since high amplification tends to increase "ground noise" especially when this amplification approaches the "noise level" of the light sensitive cell.

A further disadvantage in the present practice arises from the fact that it is frequently necessary to join two pieces of film tinted with different colors which absorb in different degrees the effective radiations passing through the sound portion of the film to the photoelectric cell so that in passing from one section of film to another unpleasant volume changes are experienced.

In accordance with the present invention it is proposed to use a series of coloring materials or dyes for tinting film which have relatively low absorption in the region to which the light sensitive cell is most efficient in order to produce a film that does not absorb an appreciable fraction of radiation used for sound reproduction and which still permits sufficient selective absorption of the radiations of those wave lengths to which the eye is sensitive so that the desired colors or tints can be obtained.

In accordance with an additional feature of the invention it is proposed to use coloring materials for tinting motion picture film which will absorb less than fifty per cent of the radiation to which the light sensitive cell is responsive when said materials are deposited on the film in amounts sufficient to give satisfactory color to motion pictures.

In accordance with a further feature of the invention it is proposed to use coloring material for tinting motion picture film which, deposited on the film in amounts sufficient to give satisfactory color to motion pictures, will not produce variations in the absorbing power evaluated in terms of the particular light sensitive cell and light source used, greater than the allowable volume variation such as $\pm 3$ transmission units.

Figure 1A:
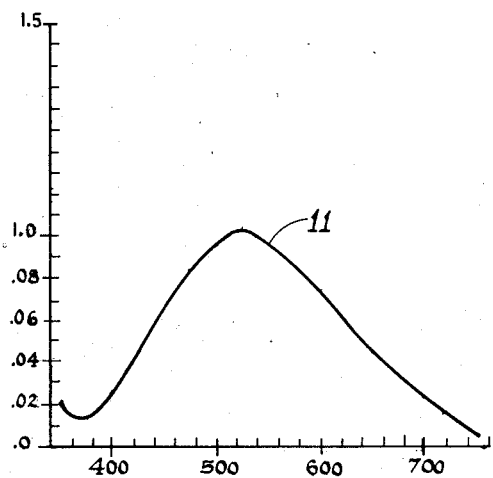
Figure 1B:
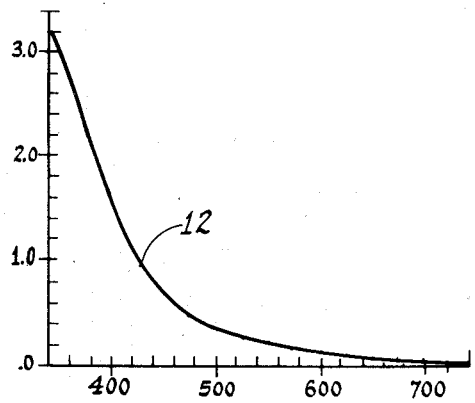

For a clearer understanding of the invention reference is made to the drawings in which Fig. 1 is a graph representing the sensitivity of a light sensitive cell of the potassium type; Fig. 2 is a graph showing the response of this type of cell functioning with a radiation source; Figs. 1A and 2A represent corresponding graphs of a barium light cell; Figs. 1B and 2B show corresponding charts of a cæsium light cell; and 1C and 2C show corresponding charts of a special cæsium light cell; while Figs. 3 to 8 inclusive show curves representing the density value (at different wave lengths) of a series of dyes or tints suitable for use with a photoelectric cell having the characteristics represented by the charts of Figs. 1 and 2; and Fig. 9 is a strip of film having differently colored sections.

In the photographic reproduction of sound from a record, light sensitive cells are used as a means for converting variations in density or variations in the width of sound record on the photographic film into variable electric currents which are then amplified to actuate a loud speaker. These light sensitive cells differ among themselves with respect to their sensitivity to radiation of different wave lengths as shown in graphs 10, 11, 12 and 13 in Figs. 1, 1A, 1B, and 1C respectively and this is also true when their response curves are evaluated in terms of their sensitivity together with the particular radiation source such as a tungsten lamp operating at a predetermined temperature as represented by the graphs 14, 15, 16 and 17 of Figs. 2, 2A, 2B, and 2C. In some cases, for example the potassium cell, this sensitivity may be concentrated largely in the extreme violet or near ultra-violet as shown in Fig. 1, but decreases rapidly for longer wave lengths and ends approximately in the region just above 500 $\mu$. However, the sensitivity of the barium cell as shown by graph 11 in Fig. 1A is distributed more or less uniformly throughout that portion of the spectral region to which the eye is sensitive (400 to 700 $\mu$). The spectral sensitivity of the cæsium cell, on the other hand, is a maximum in the blue and decreases rapidly for longer wave lengths becoming effectively zero at about 600 $\mu$ as shown in Fig. 1B. The response curve of this last cell, however, as shown in Fig. 2B is such that it will operate efficiently with films tinted with dyes which are selectively absorbing in the visible portion of the spectrum but which have high transmissions in the blue, violet and ultra-violet regions. On the contrary, the response curve of the special cæsium cell as shown in Fig. 2C is such that it will operate efficiently with films tinted with dyes which have high transmissions in the red and infra-red regions.

Figure 1C:
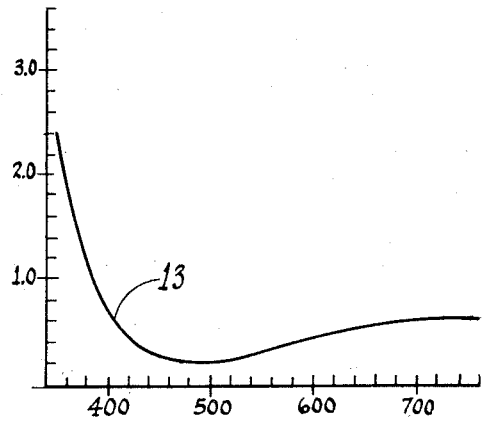

In view of these characteristics of the different light sensitive cells, namely sensitivity to different regions of the spectrum, it is therefore proposed to select a series of dyes for use in making the various tinted films such as represented in Fig. 9, so that each tinted film section 25 will have a light absorbing power, as measured in terms of the particular light sensitive element and the radiation source used, such as a tungsten lamp, which will be sensibly equal to the absorbing power of each of the other members of the series applied to other sections of the film. A series of tints suitable for use with a potassium cell having the characteristics represented in Figs. 1 and 2 and also with the special cæsium cell of Figs. 1C and 2C, is represented by the density curves of the tints shown in Figs. 3 to 7 inclusive. This series includes the neutral tint (pearl) and also those tints selectively absorbing within the visible region which give rise to colors having chromatic characteristics. The neutral tint such as pearl absorbs non-selectively in the visible region so that it has no chromatic characteristics but appears gray or uncolored and may be used, instead of the untinted film now used, to prevent undesirable volume changes in passing from a section of uncolored film to colored film sections. These tints have relatively low, uniform absorption in the spectral region to which these light sensitive cells are sensitive so that their use produces a film which does not absorb an appreciable fraction of the radiation used for sound reproduction and yet permits sufficient selective absorption of the radiation of those wave lengths to which the eye is sensitive, to give the desired color tints.

I have found that a depression in the volume of sound of 6 t. u. can be compensated for by an increase in amplification without danger of encountering "ground noise." A depression of 6 t. u. in volume of sound is produced by a density of .30, that is a transmission of 50%. It should be understood that this transmission is expressed in terms of the ration of the total transmitted flux to the total incident flux as evaluated in terms of the particular light sensitive element used and the particular radiation source from which this radiant flux emanates. Any depression of sound volume greater than 6 t. u. is extremely undesirable. It will therefore be seen that the most opaque member of the tint series should not have a density greater than .30.

A volume change corresponding to 6 t. u. occurring suddenly, as for instance when a change of tint occurs in a reel of sound film, is quite noticeable and under certain circumstances very undesirable. A change of 3 t. u. in volume is just barely noticeable and is considered to be tolerable under all circumstances. The least opaque member of a group of tinted bases for use in the production of sound positives should not have a density of less than .15 since the volume change occurring in passing from a tint having a density of .15 to one having a density of .30 is 3 t. u.

A group of tinted bases for use in the production of sound positives which can be used without undue volume variations in accordance with the above teaching, can be made according to the following formulas:

A pearl tint having the desired characteristic indicated by the curve 18 of Fig. 3 can be made by using Zapon black, metanil yellow, and toluidine blue in such proportions as to give a base which is visually nonselective and applied in such quantity that the visual density is .20 and its photoelectric density, as determined with the photoelectric cell and light source to be used in the reproduction of sound, is .20.

A satisfactory yellow tint base having the desired characteristics represented by curve 19 of Fig. 4 can be obtained by using metanil yellow, DO, in such a concentration that the photoelectric density (as determined with the photoelectric cell and light source) does not exceed .30.

A satisfactory pink tinted base represented by curve 20 in Fig. 5 can be obtained by using Fuchsine Y in such concentration that the photoelectric density (as determined with the photoelectric cell and light source) does not exceed .30. It has been found, however, that the most desirable pink can be obtained with this dye used in such a concentration as to give a photoelectric density of approximately .15.

A lavender tinted base having the required characteristics represented by curve 21 in Fig. 6 can be obtained by using Fuchsine Y and toluidine blue in such relative proportions as are required to give the desired tint of lavender and applied in such strength that the photoelectric density does not exceed .30. It has been found that the depth of tint most desirable for commercial use when made up by using the dyes specified has a photoelectric density of approximately .15.

A blue colored base, having the characteristics represented by curve 22 in Fig. 7, and meeting the requirements, can be made by using spirit blue R and toluidine blue in proper relative proportions to give the desired hue and applied in such quantities so that the photoelectric density does not exceed .30. It has been found that the most satisfactory depth of color for use commercially is obtained with these two dyes when used in such quantity that photoelectric density of .3 is obtained.

A satisfactory blue-green film of the character represented by curve 23 in Fig. 8, can be obtained by using metanil yellow, DO, and toluidine blue in proper proportions to give the desired hue and applied in such quantities so that the photoelectric density does not exceed .3.

All of the dyes mentioned are well known and their physical and chemical properties and structures may be found in the usual encyclopædias or catalogs of dyes.

It should be remembered that the exact quantity of dye required in any specific case will depend upon the commercial requirements of the tinted bases being manufactured. The formulas given above allow a certain latitude in the depth of tint in practically all cases, but if applied as specified in such quantity that the photoelectric density is not greater than .30 or less than .15, the entire group of resultant tints can be run satisfactorily in any desired sequence.

The average volume depression of these tints is approximately 4.0 transmission units and it will be noted that the hueless tint designated pearl is adjusted to give a volume depression of 4.0 transmission units, which is the approximate mean depression of the entire group so that these tints may be joined together in any desired sequence without producing any intolerable volume change at the change-over from one tint to another.

Density throughout this description is used as a designation of the light or radiation absorbing characteristic of the transmitting material and is defined as the logarithm of the reciprocal of the transmission.

A light sensitive element or light cell, as used in this specification is intended to include any radiation sensitive device which is responsive to visible and, or invisible radiations.

It should be understood that the present disclosure is for purposes of illustration only and this invention is intended to include all modifications and equivalents which fall within the scope of the appended claims.

What I claim is:

1. A motion picture film band carrying both a sound and a picture record throughout its length, the sound record being intended for use with a light sensitive element predominently sensitive to rays of a limited portion of the spectrum, said film band comprising a plurality of sections each uniformly tinted over its entire area, the different sections transmitting radiations in different portions of the visible spectrum to different degrees but transmitting to approximately the same degree radiations in that portion of the spectrum to which the photoelectric element is sensitive.

2. In combination with a light sensitive element predominently sensitive to rays of a limited portion of the spectrum, and a source of light, a motion picture film band carrying both a sound record and a picture record throughout its length, said film band comprising a plurality of sections each uniformly tinted with a different tint over its entire area, said tints being so selected that each tinted film section will have a radiation absorbing power substantially equal to the radiation absorbing power of every other section when measured in terms of the particular light sensitive element and light source used therewith.

3. In combination, a light sensitive element and a source of radiations, a motion picture film band having a motion picture record and a sound record throughout its length, said light sensitive element being responsive to radiations from said source transmitted through said sound record to produce sound, sections of said film tinted over their entire area, each section being tinted with a different color of the visible spectrum, said tints being so selected that they will produce variations in the absorbing power when evaluated in terms of the particular light sensitive element and the radiation source used, less than a predetermined allowable sound volume variation.

4. In combination with a light sensitive element, a source of radiations, a motion picture film band movable between said source of radiations and said light sensitive cell, said film band carrying both a sound record to which the light sensitive element is responsive and a picture record throughout its length, said film band comprising a series of sections, each section being uniformly tinted with a different tint over its entire area to transmit light in a different portion of the visible spectrum to a different degree from the other sections, said tints being so selected as to have low absorption for the radiation to which the light sensitive cell is responsive.

5. In combination with a light sensitive element, a motion picture film band carrying both a sound record and a picture record throughout its length, said film band comprising a plurality of sections each uniformly tinted with a different tint over its entire area, said tints being so selected that each tinted film section will transmit not less than fifty per cent nor more than seventy per cent of the radiations to which the light sensitive element is sensitive.

6. In combination, a light sensitive element, a source of radiations, a motion picture film band having motion picture exposure areas and a sound record area throughout its length, said film band comprising a plurality of sections, each section being uniformly tinted with a different tint over its entire area to transmit light in a different portion of the visible spectrum to a different degree from the other sections, the tints being so selected that each tint transmits relatively freely (that is, has a low density) in the spectral region corresponding to the maximum effective sensitivity of the light-cell-radiation-source combination by means of which the sound is produced.

7. A photographic film having exposure areas and a sound record area for use in the projection of motion pictures with sound accompaniment therefrom provided with a uniformly tinted layer applied thereto adjusted to have a radiation absorbing power such that it produces a predetermined volume depression when reproduced of the order of three transmission units as compared with a similar film that is untinted.

8. A series of strips of motion picture film each having a photographic layer over its entire area and a uniform dye layer over its entire area, the dye layers of the several strips being visibly differently colored but having to approximately the same limited degree the characteristic of transmitting radiations in the same definite portion of the spectrum, whereby said film strips are adapted to have sound and picture records formed thereon and to be assembled together sequentially for the projection of series of differently tinted motion pictures and for the uniform reproduction of sound by means of a cell predominantly sensitive to radiations in said definite portion of the spectrum.

9. A series of strips of photographic film intended and adapted for use together sequentially in the projection of motion pictures and in the reproduction of sound by means of a cell predominantly sensitive to radiations in a limited portion of the spectrum, each of the strips having a sound record portion and a picture record portion and having a photographic layer over its entire area and having also a uniform dye layer over its entire area, the dye layers of the several strips being visibly differently colored but having to approximately the same degree the characteristic of transmitting radiations in that portion of the spectrum to which the cell is sensitive, whereby said strips are adapted, when sound and picture records have been formed thereon and when assembled together sequentially, for the projection of series of differently tinted motion pictures from the picture record portions and for the uniform reproduction of sound from the sound record portions.

10. A series of strips of film useful for the reproduction of motion pictures with sound accompaniment, each strip having a photographic layer over its entire area and a uniform dye layer over its entire area, the dye layers of the several strips being visibly differently colored but having to approximately the same limited degree the characteristic of transmitting radiations in the violet region of the spectrum.

11. A series of strips of film useful for the reproduction of motion pictures with sound accompaniment, each strip having a photographic layer over its entire area and a uniform dye layer over its entire area, the dye layers of the several strips being visibly differently colored but having to approximately the same limited degree the characteristic of transmitting radiations in the violet region of the spectrum and also in the region beyond 700 $\mu$.

12. A photographic film in the form of a long band having a picture record portion and a sound record portion for use in the projection of motion pictures with sound accompaniment, and intended for use with a cell predominantly sensitive to radiation in the violet portion of the spectrum, a photographic layer over its entire area and a permanent, uniformly tinted layer over its entire area, said tinted layer being pronouncedly yellowish in color and having the characteristic of transmitting radiations in the violet region of the spectrum in such amount that the film is capable of use with a cell responsive to violet light for the reproduction of sound; the volume depression of sound so reproduced being of the order of three transmission units as compared with a similar film that is untinted.

Signed at Rochester, New York, this 9th day of April, 1929.

LOYD A. JONES.